F. ZALESKI.
SEWING MACHINE.
APPLICATION FILED DEC. 8, 1917. RENEWED SEPT. 13, 1919.

1,338,476.

Patented Apr. 27, 1920.
7 SHEETS—SHEET 6.

Inventor.
Frank Zaleski
by Heard Smith & Tennant.
Attys.

UNITED STATES PATENT OFFICE.

FRANK ZALESKI, OF BOSTON, MASSACHUSETTS, ASSIGNOR TO THE REECE BUTTON HOLE MACHINE COMPANY, OF BOSTON, MASSACHUSETTS, A CORPORATION OF MAINE.

SEWING-MACHINE.

1,338,476.                 Specification of Letters Patent.    Patented Apr. 27, 1920.

Application filed December 8, 1917, Serial No. 206,215.   Renewed September 13, 1919.   Serial No. 323,646.

*To all whom it may concern:*

Be it known that I, FRANK ZALESKI, a subject of the Emperor of Germany, residing at Boston, county of Suffolk, State of Massachusetts, have invented an Improvement in Sewing-Machines, of which the following description, in connection with the accompanying drawing, is a specification, like characters on the drawing representing like parts.

This invention relates to sewing machines of that type which are adapted to produce a series of short seams such as spaced-apart buttonholes, each of which seams is formed by concatenating an upper and an under thread.

One of the objects of the invention is to provide a novel mechanism for seizing the under thread at the end of each seam and cutting said thread close to the work, said mechanism being constructed also to cut or trim the stay-cord, if one is used, close to the work, so that the seam will present no projecting thread ends.

Other objects of my invention will be more fully set forth in connection with the following detailed description.

In order to give an understanding of my invention, I have illustrated in the drawing a selected embodiment thereof which will now be described, after which the novel features will be pointed out in the appended claims.

I have chosen to illustrate my invention herein as it would be applied to a buttonhole sewing machine of the well-known Reece type, an example of which may be found in United States Letters Patent No. 1,188,942, dated June 27, 1916. This sewing machine comprises work-holding means by which the work is held and stitch-forming mechanism for producing the buttonhole stitches. The work-holding means is in the form of a clamp plate 1 which is slidably mounted upon the bed plate 2 of the sewing machine frame and work clamps 3 carried by arms 4 pivoted to the clamp plate and which are movable toward and from the clamp plate for clamping the work $w$ and releasing it.

The stitch-forming mechanism comprises upper thread-handling mechanism in the form of an eye-pointed needle 5 carried by the needle bar 6 which is mounted for vertical reciprocation in the head or overhanging arm 7 of the frame, and an under thread-handling mechanism which is mounted on a rotary turret 8 and which comprises an under or lower oscillating needle 9 and a looper 10. The turret 8 is mounted for rotation in suitable bearings 11 carried by the depending portion 12 of the frame, and it is provided at its upper end with a throat-plate 13 having an opening through which the upper and under needles operate. The required movements of the under needle 9 and looper 10 are secured from a spindle 20 which is mounted in the turret for vertical reciprocation, suitable connections being provided between the spindle and needle 9 and looper 10 to cause them to have their proper movements as the spindle is reciprocated. The spindle is connected at its lower end to a rocking lever 21 pivotally mounted at 22, the rear end of said lever having a link 23 connected thereto which is actuated from an eccentric on the driving shaft 24 for the stitch-forming mechanism.

The turret has a pinion 14 rigid therewith which meshes with a segmental gear 15 carried by a rock-shaft 16, and the needle bar 6 also has a pinion 17 thereon which meshes with a rack bar 18 carried by the rock-shaft 16. The rock-shaft 16 is operated at the proper time from a main cam 19 so as to turn the turret and upper needle during the stitching around the ends of the buttonhole. The work-holding means and the stitch-forming mechanism are arranged to have a movement relative to each other, and in the machine herein shown, this movement is provided for by making the work-holding means capable of reciprocating movement on the bed plate, such reciprocating movement being derived from the feed cam 19 by any suitable means usually employed in buttonhole machines of this type.

25 indicates a buttonhole cutter pivotally mounted to the frame at 26 and which is actuated from the cam 19 at the proper time to cut the buttonhole.

I have above referred briefly to some of the essential parts of a buttonhole sewing machine of the type above mentioned, and before entering into a description of my improvements, I will recite briefly the sequence of operations performed in stitching a buttonhole.

Figure 1:
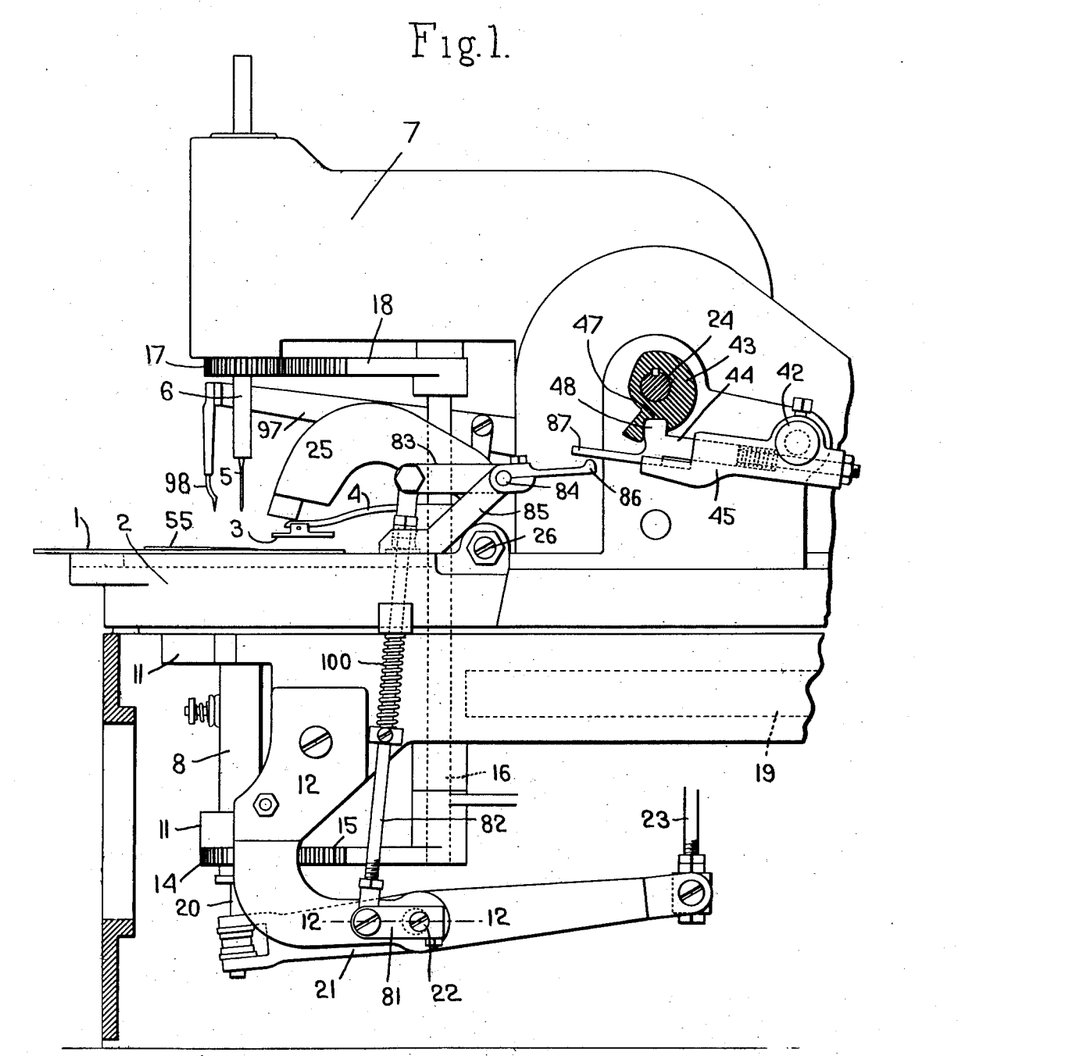
Figure 1 is a side view of a sewing machine embodying my invention.

When the machine is at rest, the needle 5 and work clamp 3 are both raised and the work-holding means is so positioned that the work $w$ supported thereby will be placed properly to have the buttonhole cut therein by the cutter 25, this being referred to as the buttonhole-cutting position. When the machine is started, the work clamps 3 are first depressed against the work $w$ to clamp the latter to the clamp plate 1, and the cutter 25 is actuated to cut the buttonhole. As soon as the buttonhole is cut, the clamp plate is given a quick movement toward the left in Fig. 1 to bring the work into buttonhole-stitching position, at which time the shaft 24 is set in operation to actuate the stitch-forming mechanism to cause it to produce a series of stitch-forming movements which form the edge stitches on the cut buttonhole. During the stitching operation the work-holding means is given a slow feeding movement first in one direction and then in the other to cause the stitches to be formed down one side of the buttonhole and then back along the other side, the stitch-forming mechanism being rotated at the ends of the buttonhole so that the stitches will be properly formed around the buttonhole end. When the stitching on the buttonhole is completed, the shaft 24 is brought to rest automatically by a suitable stop motion, the work clamps 3 are raised, and the work-holding means is given a quick movement to the right, Fig. 1, to bring it from stitching to buttonhole-cutting position again, at which time the machine comes to rest.

The shaft 24 is driven from a driving belt, and said shaft is started in operation or brought to rest by shifting the belt either onto the pulley 39 which is fast on the shaft, or onto the pulley 40 which is loose on the shaft. The shifting of the belt is accomplished by a belt shifter 41 carried by a belt-shifting rod 42. When the belt is shifted onto the loose pulley 40, the machine is brought to rest with the needle raised by means of a stop motion which is herein shown as comprising a stop cam 43 fast on the shaft 24, and a stop member 44 which is yieldingly carried by an arm 45 fast on the actuator rod 42. When the machine is to be started the actuator rod is moved to carry the belt onto the fast pulley 39, in which position it will become locked, and this movement will carry the stop member 44 laterally out of engagement with the stop cam 43. At the end of the stitching operation the actuator 42 is released automatically and the spring 46 will force it longitudinally to shift the belt onto the loose pulley. This will bring the stop member 44 in the path of the stop cam 43. The engagement of the eccentric portion of the stop cam with the stop member 44 will produce a braking effect, and when the stop cam has been turned into the position shown in Fig. 1, so that the notch 47 therein comes in line with the end 48 of the member 44, the latter will drop into the notch thereby positively stopping the shaft 24.

One feature of my present invention relates to novel means for seizing the under thread $u$ at the end of the stitching operation and drawing out a length of said under thread from the source of supply, and gripping said thread, and also means for severing the thread between the holding means and the work. The means for thus seizing and holding the under thread is mounted on the turret 8 and is rendered operative by the turning movement of the turret to seize the under thread at the end of the stitching operation and to clamp said thread against the under side of the throat plate 13. The trimming mechanism for the under thread is mounted on the clamp plate 1 and it is rendered operative to cut the under thread beneath the work at the proper time by the relative movement between the clamp plate and the bed plate 2 as the clamp plate is moving from stitching to buttonhole-cutting position.

Figure 7:
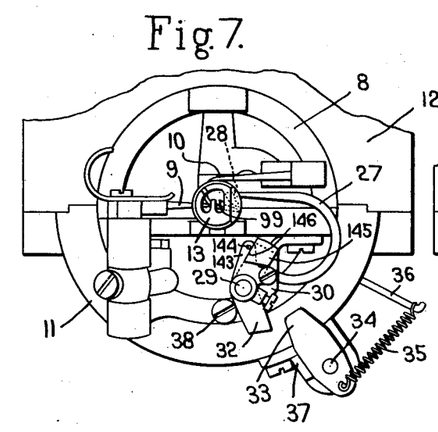
Figs. 7 and 8 are top plan views of the under thread-handling mechanism.

The device for seizing and holding the under thread is in the form of a curved arm 27 having a hook 28 at the end thereof, said arm being fast on a rock-shaft 29 which is mounted in bearings in a bracket 30 secured to the turret 8. The rock-shaft is acted upon by a suitable spring 31 which tends to swing the arm into and maintain it in the position shown in Fig. 7, in which position the hook 28 is directly underneath and in contact with the under side of the throat-plate 13. The spring-impelled movement of the rock-shaft is limited by the engagement of an arm 32 fast on the rock shaft with a stop 38.

Figure 8:
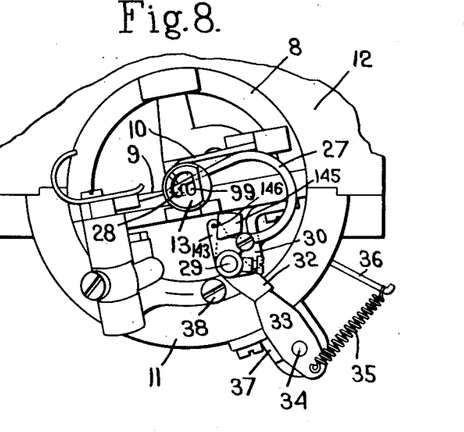
Figure 16:
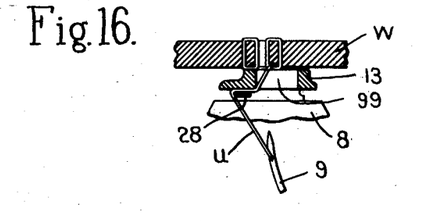
Fig. 16 is a fragmentary sectional view showing the operation of the under thread clamping member.

33 is an arm pivoted to the frame at 34 and having connected thereto one end of a pulling spring 35, the other end of which is fast to the post 36 also carried by the frame. The action of the spring 35 is to yieldingly hold the arm 33 against the fixed stop 37. The inner end of the arm 33 is situated to be engaged by the end of the arm 32 as the turret rotates, and when the turret is rotating in an anti-clockwise direction, Fig. 7, the engagement of the arm 32 with the arm 33 will merely turn the arm 33 aside against the action of the spring 35. When the turret rotates in the opposite direction, however, the engagement of the arm 32 with the arm 33 will cause the arm 32 to turn aside thereby swinging the rock-shaft 29 and carrying the thread-engaging arm 27 into the position shown in Fig. 8. As soon as the turret has rotated sufficiently to carry the arm 32 past the arm 33, then the spring 31 will return the thread-engaging arm 27 to the position shown in Fig. 7. The movement of the thread-engaging arm 27 into the position shown in Fig. 8 carries the hook 28 thereof back of the under thread $u$ which passes down through the opening 99 of the throat-plate, and during the return movement of the thread-engaging arm 27 into the position shown in Fig. 7, the hook 28 will engage the under thread $u$ and draw it to one side slightly and thereby clamp said thread against the under side of the throat-plate 13, as shown in Fig. 16.

In sewing machines of this type, the mechanism for operating the turret is such that the turning movement of the turret will be continued after the stitch-forming mechanism has been brought to rest and while the work is being carried from stitching to buttonhole-cutting position, and the thread-gripping arm 27 and its operative parts are so positioned and constructed that the thread-gripping movement of the arm 27 will occur after the stitching mechanism has been brought to rest by the stop motion and during the movement of the work-holding means from stitching to buttonhole-cutting position.

Figures 13, 14:
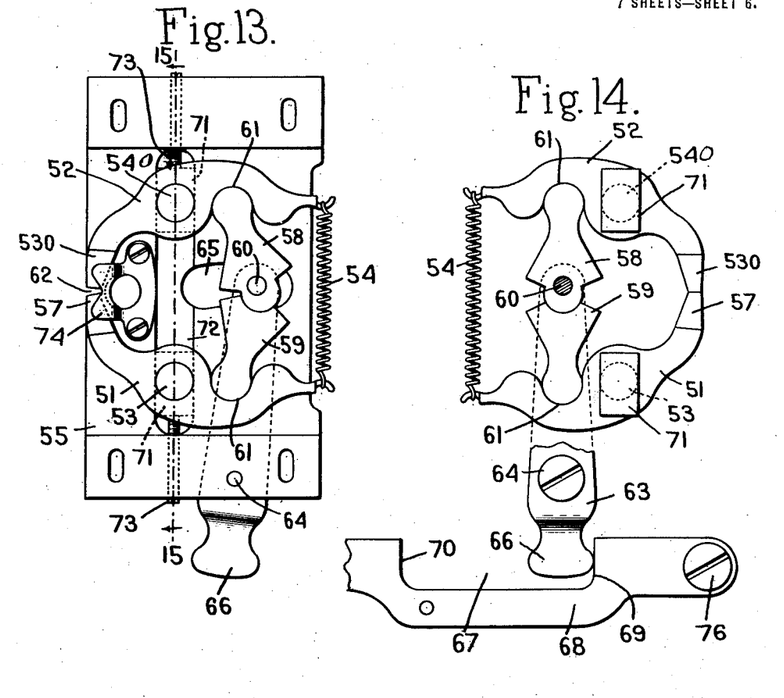
Fig. 13 is an underside view of the thread-trimming mechanism.
Fig. 14 is a top plan view of the operative parts of the thread-trimming mechanism.
Figure 15:
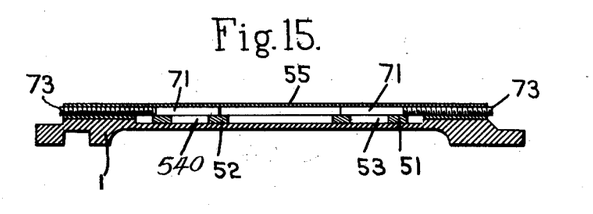
Fig. 15 is a section on the line 15—15, Fig. 13.

After the under thread $u$ has thus been drawn out and clamped against the under side of the throat-plate, and while the clamp plate is moving from stitching to buttonhole-cutting position, a thread-trimming device carried by the clamp plate is rendered operative to cut the under thread $u$ and stay-cord directly above the throat-plate. This thread-trimming device is best seen in Figs. 13 and 14. It comprises two levers 51 and 52 which are pivotally mounted on two studs 53 and 540, respectively, that are carried by a plate 55 that is adapted to be removably secured to the clamp plate 1 by means of screws 56. The lever 51 carries at its end a cutting block 57 and the lever 52 carries at its end a knife 530. The opposite ends of the levers are connected by a spring 54 which tends to separate the operative ends from each other. The knife is closed against the block by means of a toggle lever device shown as two toggle members 58, 59 which are pivotally connected at 60, and each of which has a rocking engagement with one of the levers as shown at 61. When the toggle lever is broken or in the position shown in Fig. 13, the spring 54 operates to separate the cutter and cutting block. The operation of straightening the toggle lever into the position shown in Fig. 14 forces the cutter 530 against the cutting block 57, and as soon as the toggle lever is carried past its central position in either direction, the spring 54 will operate to separate the cutting blade and cutting block again. The plate or cover 55 is recessed on its under side to receive the levers 51, 52 and their operative mechanism, and is provided at one edge with a thread-receiving notch 62 situated directly above the knife 530 and block 57 when they are in cutting position. The plate 55 and the thread-trimming devices are so placed on the clamp plate that they are in front of the buttonhole during the sewing operation, as seen in Fig. 17, but when the buttonhole is finished and the clamp plate is moved into buttonhole-cutting position the notch 62 is brought over the throat-plate 13, as seen in Fig. 18, and the under thread $u$ and stay-cord $s$ are thus carried into said notch and placed in position to be cut.

The cutting movement of the knife 530 and block 57 occurs just after the under thread and stay cord are entered into the notch 62 and is derived by or through the movement of the clamp plate as it travels from stitching to buttonhole-cutting position. For this purpose the plate 55 has a lever 63 pivoted thereto at 64, one end of the lever being pivotally connected to the stud 60 of the toggle device, which stud operates in a slot 65 formed in the plate 55. The end 66 of the lever 63 projects beyond the clamp plate and operates in a recess 67 formed in a controlling member 68 that is carried by the bed plate 2 of the machine. The recess 67 is so positioned and of such dimensions that during the movement of the clamp plate 1 from stitching to buttonhole-cutting position, the end 66 of the lever 63 will be brought against the shoulder 69 of the recess 67 thereby turning the lever 63 and carrying the toggle levers 58, 59 past the center. This operation of the toggle device will actuate the cutter, as above described, and the parts are so timed that the cutting operation occurs just after the stay cord *s* and under thread *u* are placed in the notch 62, and thus both the under thread *u* and stay-cord *s* are cut between the work and the throat-plate. During the movement of the clamp plate in the opposite direction, the end 66 of the lever will be brought against the shoulder 70 of the recess 67, thereby swinging the toggle lever back into its initial position again, during which operation, the cutting blade will be closed against the knife, but without any effect. The studs 53 and 540 on which the levers 51, 52 are pivoted are adjustable so that they can be properly positioned to cause the cutting edge 530 to meet the cutting block 57 each time that the toggle device is straightened. Each pivotal stud is carried by a block 71 which is slidably mounted in a groove 72 formed in the plate 55, and each block is backed by an adjusting screw 73 by which its position can be determined.

With the above device, the cutting action is a positive one as the movement of the cutting blade toward the cutting block is accomplished by the action of the toggle device, and hence the stay-cord *s* and under thread *u* will always be properly severed.

Figure 2:
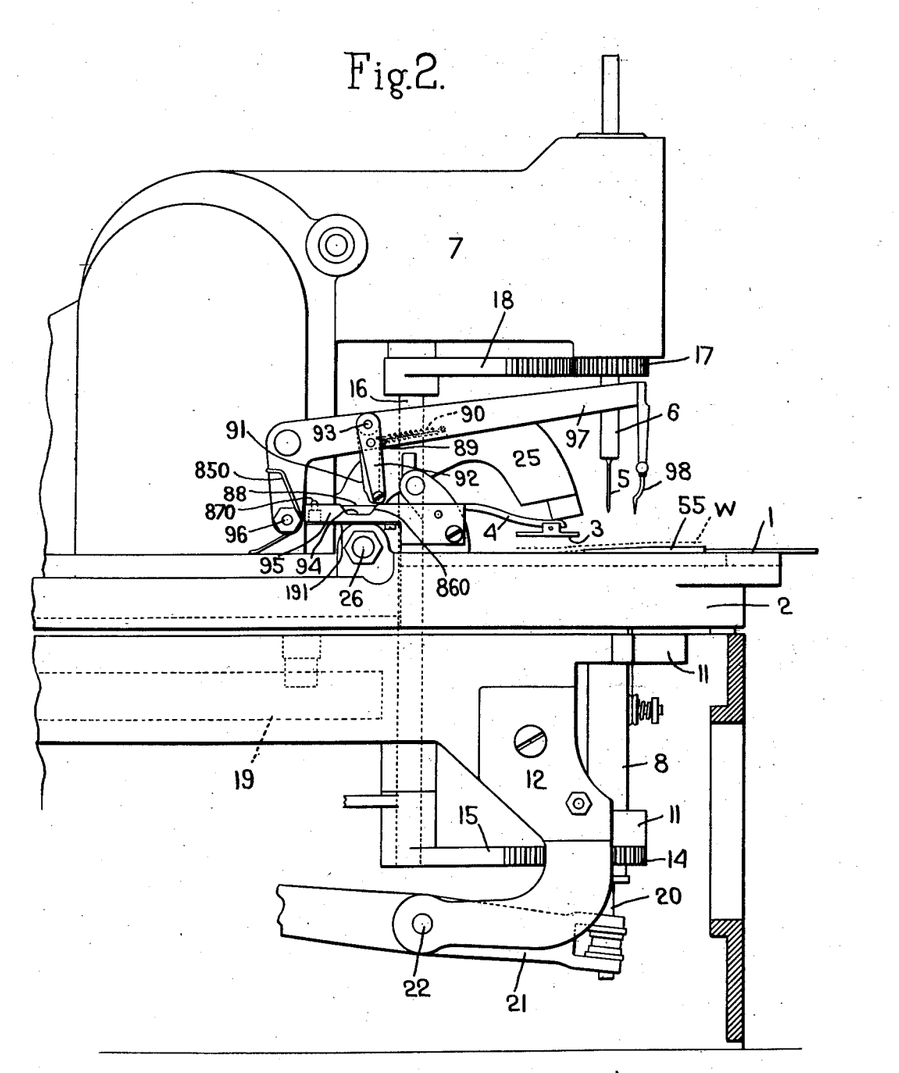
Fig. 2 is a view showing the opposite side of the sewing machine from that shown in Fig. 1.
Figure 3:
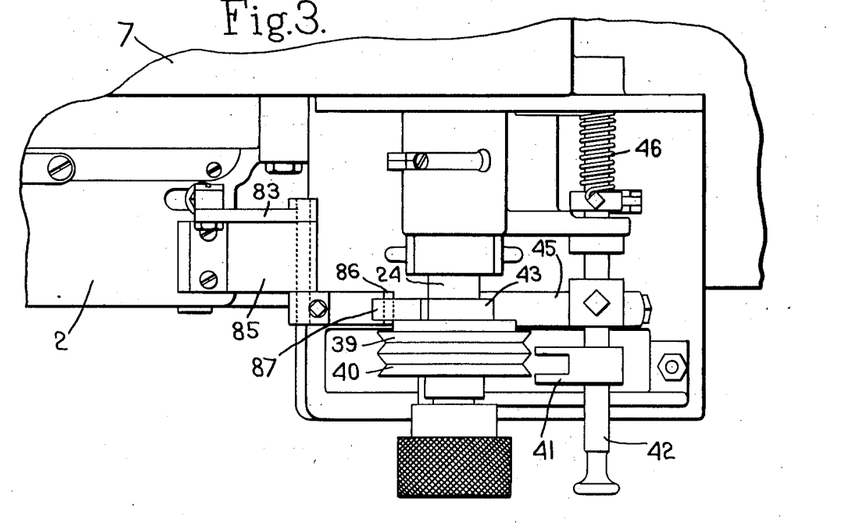
Fig. 3 is a plan view of the driving and stopping mechanism.
Figure 4:
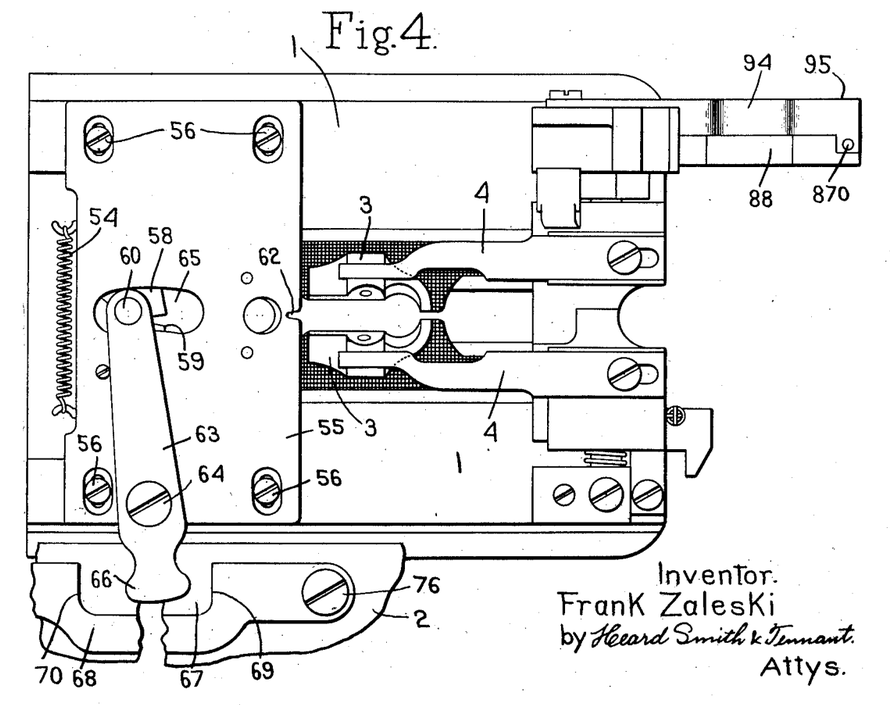
Fig. 4 is a plan view of the work-holding means.
Figure 5:
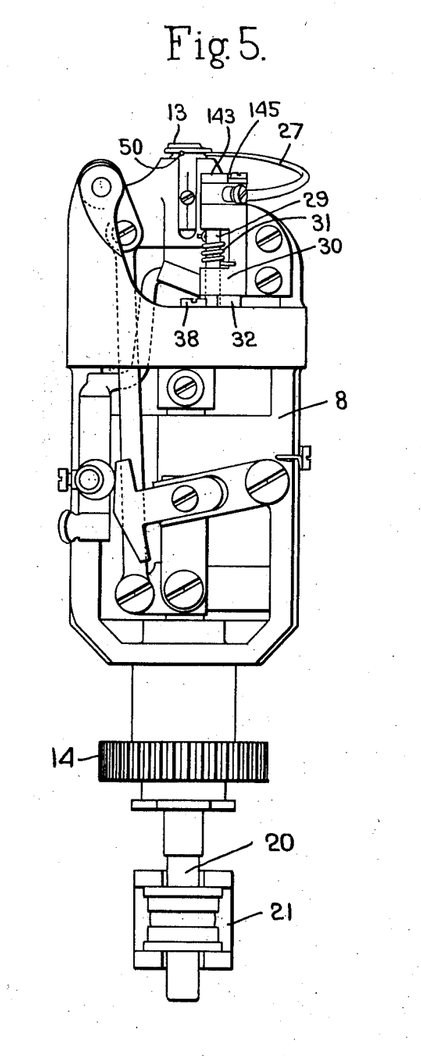
Figs. 5 and 6 are two views of the under thread-handling mechanism.
Figure 6:
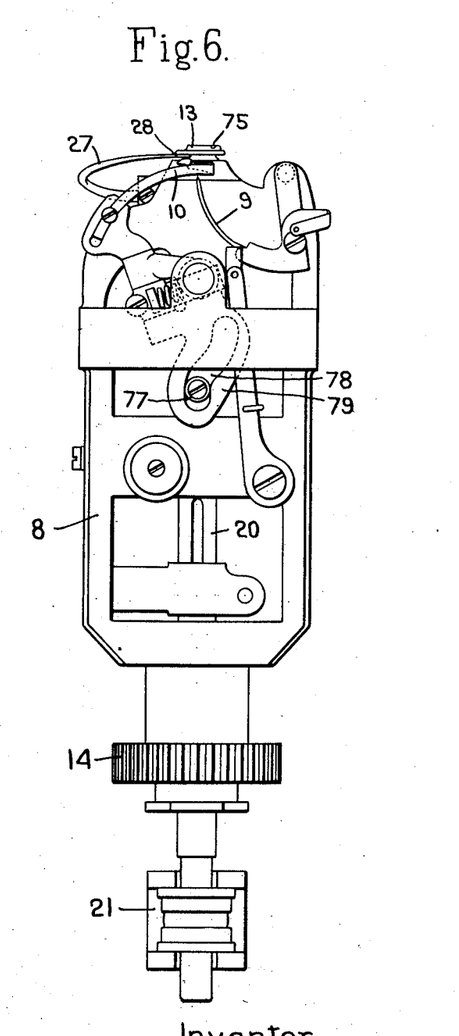
Figures 17, 18, 19, 20, 21, 23:
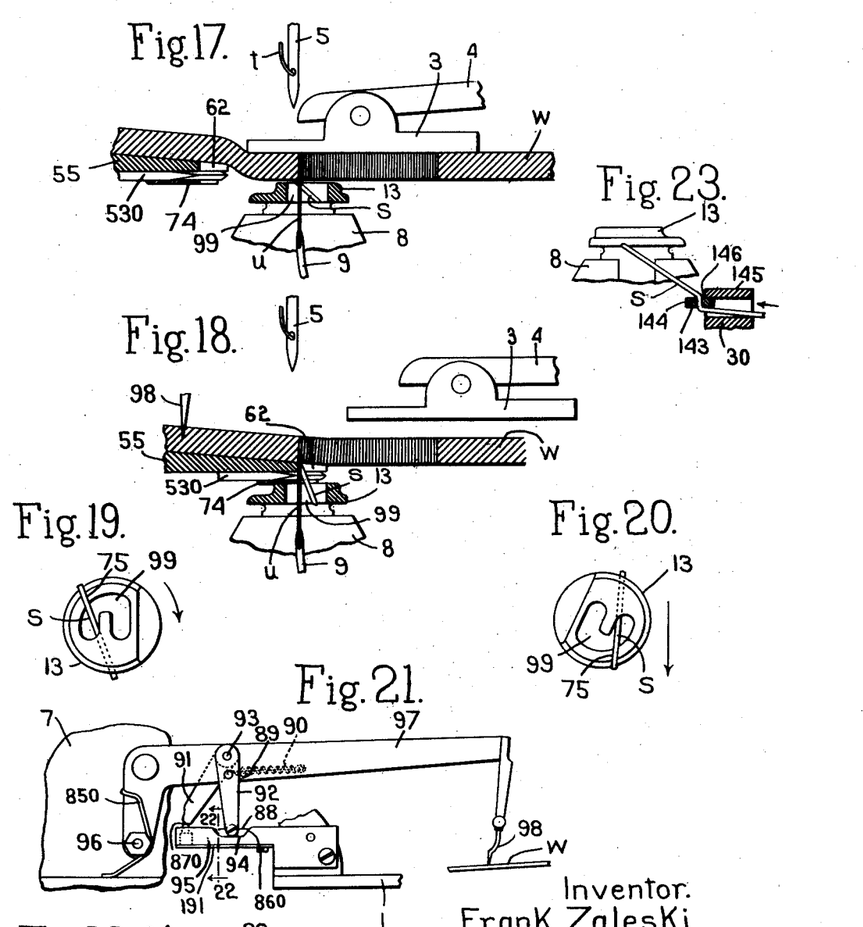
Figs. 17 and 18 are sectional views showing the operation of the under thread trimming mechanism.
Figs. 19 and 20 are plan views of the throat-plate showing the manner in which the end of the stay-cord is held.
Fig. 21 is a view showing the operation of the work-retaining prong.
Fig. 23 is a sectional view showing the operation of the clamping device for the stay-cord.
Figure 22:
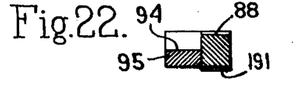
Fig. 22 is a section on the line 22—22, Fig. 21.

In order that the under thread *u* and stay cord may thus be invariably entered into the notch 62, it is desirable to hold the work *w* from movement during the movement of the clamp plate from stitching to buttonhole-cutting position, or from the position shown in Fig. 17 to that shown in Fig. 18. I have provided for this purpose a work-holding member in the form of a prong 98 which is carried by a lever 97 that is pivotally mounted on the frame at 96 and acted upon by a spring 850 which tends to depress it, said lever being controlled so that it is moved to depress the prong 98 into the work just as the work is unclamped and as the clamp plate moves from stitching to buttonhole-cutting position. This work-holding prong will, therefore, hold the work from movement as the clamp plate is moved, and will thus insure that the under thread and stay-cord are carried into the notch 62. The operative movement of the work-holding prong 98 is secured by or through the movement of the clamp plate. The clamp plate has secured thereto a rearwardly-extending arm 95 which is provided with a depression or recess 94. The arm 97 has fixed thereto an arm 92, the lower end of which is immediately over the portion of the arm 95 that has the depression 94 therein. Said lever has another arm 91 pivoted thereto at 93, said arm being acted upon by a suitable spring 90 which tends to hold it against the stop 89, but permits it to yield toward the left, Fig. 2. When the clamp plate 1 moves to the right, Fig. 2, thereby to carry the work from buttonhole-cutting to stitching position, the arm 91 has engagement with the upper plain surface 88 of the arm 95 so that during such movement of the clamp plate the arm 97 and work-holding prong 98 will be held in their raised position. As the clamp plate continues its movement after the stitching has commenced thereby to feed the work to effect the stitching down one side of the buttonhole, the arm 95 will be moved sufficiently to the right so that the pin 870, which is acted on by the spring 191, will be carried under the arm 91, said pin yielding as the arm 91 passes over it. When the stitching down the first side of the buttonhole has been completed, the clamp plate begins its movement to the left, Figs. 2 and 21, thereby first to effect the stitching on the other side of the buttonhole, and after the stitching is completed, to carry the work clamp from stitching to buttonhole-cutting position. During the initial return movement of the clamp plate, the pivoted arm 91 engages the pin 870 and because the arm 91 can swing to the left, Fig. 2, the engagement of the pin 870 with the lower end of said arm will move it backwardly so that the arm 97 is supported entirely by the fixed arm 92. By the time that the stitching on the buttonhole is completed and the clamp plate is ready to move from stitching to buttonhole-cutting position, the arm 95 has been brought into position so that the arm 92 is just at the left-hand end of the recess 94 so that during the initial movement of the clamp plate in traveling from stitching to buttonhole-cutting position, the recess 94 will pass under the arm 92 thereby allowing the arm 97 to descend and bring the work-holding prong into engagement with the work. This occurs just after the work is unclamped and the work is thus held stationary while the clamp plate moves forward to cause the under thread and stay cord to be entered into the notch 62. At the end of the movement of the clamp plate from stitching to buttonhole-cutting position, the inclined wall 860 of the recess comes into engagement with the arm 92 and raises the arm 97 to the position shown in Fig. 2, and as soon as the arm is thus raised, the spring 90 will swing the arm 91 into the position shown in Fig. 2 so that said arm 91 will then act to hold the arm 97 raised during the movement of the clamp plate to the right at the next stitching operation.

I have described above how the hook 28 operates to hold the under thread after it is severed and until the stitching is commenced on the next buttonhole. I have also provided means for insuring that the end of the stay-cord *s* will be held in proper position when the stitching commences on any buttonhole. This is accomplished by forming the throat-plate 13 with a cord-receiving notch 75 and by providing a positioning plate 74 on the under side of the plate 55 and directly beneath the cutter 530 and cutting block 57. This plate 74 is so arranged that when the work clamp is moved from stitching to button-hole-cutting position, said plate will be carried directly over and in contact with the throat-plate 13, and the notch 75 in said throat-plate is so situated that this movement of the positioning plate 74 will bend the severed end of the stay-cord into said notch so that when the machine comes to rest, the end of the stay-cord is held in the notch 75, as seen in Fig. 19. When the machine is started in operation again, the turret has a slight turning movement while the buttonhole is being cut and the work is being carried from buttonhole-cutting to stitching position, and during this turning movement the plate 74 holds the end of the stay cord in the notch 75. By the time that the clamp plate is in stitching position the turret has turned so that the notch 75 is in the position shown in Fig. 20 and hence when the feeding movement of the work starts as the stitching commences, the friction of the throat-plate with the underside of the work will lay and maintain the end of the stay cord in the notch 75 until after the first stitches have been formed thereover.

The plate 55 with the trimming mechanism thereon is a self-contained device which is readily removable from the clamp plate 1. The clamp plate in turn in constructed so that it can be removed from the bed plate 2. In order that the controlling member 68 may not interfere with such operation, I propose to pivotally connect the controlling member to the bed plate 2, as shown at 76. This permits the controlling member to be swung away from the clamp plate so as to withdraw the shoulders 70 from the path of movement of the end 66 of the lever 63.

In the ordinary operation of a sewing machine of this type, the upper needle carries a loop of upper thread *t* through the work and through a loop of under thread *u* at each penetrating thrust, and the looper 10 is actuated to engage each loop of upper thread after it has been carried through the loop of under thread and retain open said loop of upper thread while the under needle 9 is retracted and again moved forwardly to carry a loop of under thread through said loop of upper thread, said looper having engagement with the loop of upper thread when the needle 5 is raised. Hence when the machine is brought to rest with the needle 5 raised, a loop of upper thread will be held by the looper 10, and if the thread is cut beneath the work, a short length of thread will be produced which constitutes the loop of upper thread. One short length will be produced for each buttonhole, and after the machine has been in operation for some time, the accumulation of these short lengths is apt to clog up and interfere with the operation of the under thread mechanism. The machine herein shown is provided with means for preventing the looper from engaging the loop of upper thread during the last stitch-forming movement so that when the machine is brought to rest there will be no loop of upper thread held by the looper. I accomplish this by retarding the motion of the looper during the last stitch-forming movement so as to cause it to miss or skip the loop of upper thread.

Figure 9:
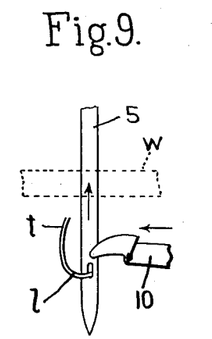
Fig. 9 is a fragmentary view showing the normal operation of the looper.

It will be remembered that the motion of the looper is derived from the vertical movement of the spindle 20, the latter having a roll 77 which operates in a cam slot 78 formed in a member 79 that is connected to the looper, and that during the stitching operation the vertical reciprocations of the spindle 20 occur at such intervals as to cause the looper to properly enter each loop of upper thread. This operation is illustrated diagrammatically in Fig. 9 wherein the needle 5 is illustrated as being withdrawn from the work, thus to throw out the loop *l* of upper thread *t* and the point of the looper 10 is illustrated as just entering the loop *l*.

Figure 10:
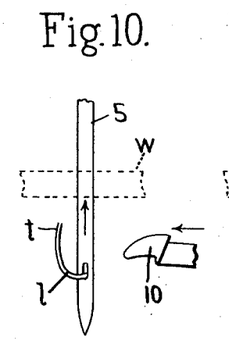
Figs. 10 and 11 are views showing the operation of the looper during the last stitch-forming movement.
Figure 11:
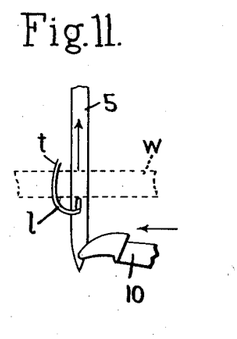
Figure 12:
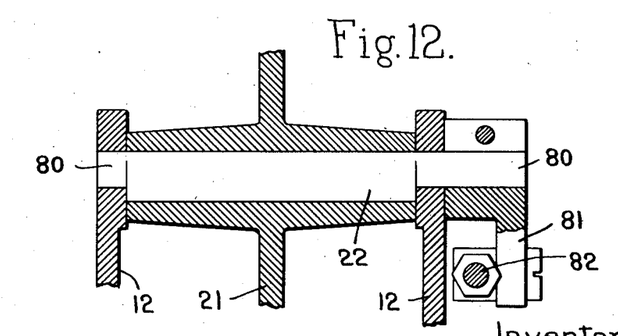
Fig. 12 is a section on the line 12—12, Fig. 1.

To cause the looper to miss the loop during the last stitch-forming movement, the movement of the spindle 20 is retarded so that the forward movement of the looper will not occur until after the needle 5 has been raised to such a point as to lift the loop *l* of upper thread above the looper. If, for instance, when the needle is in the position shown in Fig. 9, the looper 10 is retracted to occupy the position shown in Fig. 10, then by the time the looper reaches the point of the needle, the latter will be elevated into the position shown in Fig. 11, in which position the eye of the needle is above the looper and the looper will, therefore, miss the loop *l* of upper thread. I propose to secure this retarding or retracting movement of the looper by means controlled by the stop motion so that just when the machine is coming to rest and the needle 5 is being raised during the last stitch-forming movement, the looper will receive its retarding or retracting movement and will thus skip the last stitch. The lever 21 by which the spindle 20 is given its vertical reciprocation is pivotally mounted on a pivotal pin 22 carried by the frame 12. The ends 80 of this pivotal pin which are journaled in the frame 12 are eccentrically situated, and as a result, if the pivotal pin 22 is turned about its ends 80 as an axis, the lever 21 will be raised or lowered, and since the rear end of the lever is connected to the rod 23, such raising or lowering will be effective at the front end where it is connected to the spindle 20. One of the ends 80 has an arm 81 fast thereon which is connected to the lower end of a rod 82 that extends up through the bed plate and is connected at its upper end to a lever 83 pivoted at 84 to a bracket 85 carried by the bed plate. The rear end of this lever 86 is situated in position to be engaged by a finger 87 extending from the stop member 44 when said stop member is being depressed by the eccentric portion of the stop cam. Hence, when the stop motion is set in operation to bring the machine to rest and the stop cam is acting on the stop member 44, the downward swinging movement of the latter will rock the lever 83 thereby raising the rod 82 and turning the pin 22. This will raise the lever 21 and consequently raise the spindle 20 slightly, such movement operating to retract or retard the looper relative to the upper needle. In other words, during the last stitch-forming movement the looper is thrown out of time with the other elements of the stitch-forming mechanism and the looper is thus caused to miss or skip the loop $l$ of the upper thread. Hence when the cutter is actuated there will be only the under thread and stay cord leading from the under side of the work, both of which will be cut close to the work.

When the stitching operation is started on the next buttonhole the looper is automatically returned to its normal position in proper timed relation with the upper needle because the starting of the stitching operation involves shifting the actuator rod 42 to carry the belt onto the fast pulley, and this movement of the actuator rod carries the arm 87 laterally out of engagement with the end 86 of the arm 83. The rod 82 is acted upon by a spring 100 which tends to force it downwardly and, therefore, as soon as the arm 83 has been released from its engagement with the arm 87, the spring 100 will return the looper to its proper position.

Any suitable mechanism (not shown) may be used for cutting and holding the upper thread $t$ above the work.

The device herein shown is also provided with means for guiding the stay cord as it is delivered to the throat-plate, which device is in the nature of a clamp that permits the stay cord to be freely delivered to the throat-plate, but prevents it from being drawn backwardly. This device is in the form of a clamping member 143 which is pivotally mounted on the upper end of the shaft 29 and which is provided with a guide-eye 144 through which the stay cord $s$ is delivered. The bracket 30 is formed with a portion 145 which overlies the end of the clamping member 143. The stay cord passes through the aperture 99 of the throat-plate and then laterally through an opening 50 immediately beneath the throat-plate, and thence through the guide-eye 144 and underneath the clamping member 143 to the supply. The guide-eye 144 is situated below but at one side of the aperture 50 so that in passing from said guide-eye 144 to the throat-plate the stay cord has an inclined position. Thus the forward feeding movement of the stay cord tends to swing the clamping member 143 to the left, Figs. 7 and 8, thus carrying the stay cord away from the clamping edge 146. Since the stay cord passes horizontally underneath the clamping member 143, it will be apparent that if a backward pull is exerted on the stay cord which would tend to withdraw it from the throat-plate, such movement will tend to swing the clamping member 143 to the right, Figs. 7 and 8 and thus cause the stay cord where it merges from the aperture 143 to be clamped against the clamping edge 146. The stay cord is thus locked from backward movement while permitted to move freely forwardly. The means for preventing the looper from engaging the loop of upper thread during the last stitch-forming movement of the stitch-forming mechanism is not claimed herein as it has been made the subject of another application Se. No. 234,047, filed May 13, 1918, which has been divided out of this application.

While I have illustrated herein a selected embodiment of my invention, I do not wish to be limited to the constructional features shown.

I claim:

1. In a sewing machine of the type having stitch-forming mechanism, work-holding means, means to actuate the stitch-forming mechanism to perform a predetermined sewing operation and then bring it to rest, and means to cause the stitch-forming mechanism and work-holding means to have a relative feeding movement, the combination with said work-holding means, of two coöperating cutting elements pivotally carried thereby beneath the work and located in such a position that the under thread is brought into position to be cut during said relative movement, and a toggle device for actuating said cutting elements.

2. In a sewing machine of the type having stitch-forming mechanism, work-holding means, means to actuate the stitch-forming mechanism to perform a predetermined sewing operation and then bring it to rest, and means to cause the stitch-forming mechanism and work-holding means to have a relative feeding movement during such sewing operation and a further relative movement at the end of the sewing operation, the combination with said work-holding means, of two coöperating cutting elements carried thereby and so located that the under thread is brought into position to be cut during such further relative movement, a toggle device for actuating said cutting elements, and means operated by such relative movement to actuate the toggle device.

3. In a sewing machine of the type having stitch-forming mechanism, work-holding means, means to perform a predetermined sewing operation and then bring it to rest, and means to cause the stitch-forming mechanism and work-holding means to have a relative feeding movement during such sewing operation and a further relative movement at the end of the sewing operation, the combination with said work-holding means, of two coöperating cutting elements pivotally mounted thereon, a spring normally holding said elements separated, the latter being so located that the under thread is brought into position to be cut thereby during such further relative movement, a toggle device for actuating said cutting elements, and means operated during such further movement to actuate the toggle device.

4. In a sewing machine, the combination with stitch-forming mechanism, of work-holding means, two coöperating cutting elements pivotally mounted on the work-holding means and situated beneath the work, a toggle device for actuating said elements, and means operative automatically to actuate the toggle device at the end of the sewing operation.

5. In a sewing machine, the combination with stitch-forming mechanism, of work-holding means comprising means to hold the work clamped during the stitching operation, two coöperating cutting elements pivotally mounted on the work-holding means and situated beneath the work, a spring normally holding said elements separated, and a toggle device for actuating said elements.

6. In a sewing machine, the combination with stitch-forming mechanism, of work-holding means, two coöperating cutting elements pivotally mounted on the work-holding means and situated beneath the work, a spring normally holding said elements separated, a toggle device for actuating said elements, and means operative automatically to actuate the toggle device at the end of a sewing operation.

7. In a sewing machine, the combination with stitch-forming mechanism, of work-holding means, means to actuate the stitch-forming mechanism to perform a predetermined sewing operation and then come to rest, means to give the work-holding means a feeding movement during the sewing operation and a further movement at the end of the sewing operation, a device for cutting the under thread beneath the work carried by said work-holding means, means to hold the work from movement during such further movement of the work-holding means whereby the under thread is brought into position to be cut, and means to actuate said cutting device.

8. In a sewing machine, the combination with stitch-forming mechanism, of work-holding means, means to actuate the stitch-forming mechanism to perform a predetermined sewing operation and then come to rest, means to give the work-holding means a feeding movement during the sewing operation, and a further movement at the end of the sewing operation, a device for cutting the under thread beneath the work carried by said work-holding means, means to hold the work from movement during such further movement of the work-holding means whereby the under thread is brought into position to be cut, and means actuated by such further relative movement to operate the cutting device.

9. In a sewing machine, the combination with stitch-forming mechanism, of work-holding means, means to actuate the stitch-forming mechanism to perform a predetermined sewing operation and then come to rest, means to give the work-holding means a feeding movement during the sewing operation and a further movement at the end of the sewing operation, a device for cutting the under thread beneath the work carried by said work-holding means, a work-holding prong to engage the work and hold it from movement during such further movement of the work-holding means whereby the under thread is brought into position to be cut, and means to actuate said cutting device.

10. In a sewing machine, the combination with stitch-forming mechanism, of work-holding means, means to actuate the stitch-forming mechanism to perform a predetermined sewing operation and then come to rest, means to give the work-holding means a feeding movement during the sewing operation and a further movement at the end of the sewing operation, a device for cutting the under thread beneath the work carried by said work-holding means, a work-holding prong controlled as to its movement by the movement of the work-holding means and adapted to engage the work during the further movement of the work-holding means thereby to hold the work from movement so that the under thread is brought into position to be cut, and means to actuate said thread-cutting device.

11. In a sewing machine, the combination with stitch-forming mechanism, of work-holding means, means to actuate the stitch-forming mechanism to perform a predetermined sewing operation and then come to rest, means to give the work holding means a feeding movement during the sewing operation and a further movement at the end of the sewing operation, a device for cutting the under thread beneath the work carried by said work-holding means, a work-holding prong controlled as to its movement by the movement of the work-holding means and adapted to engage the work during the further movement of the work-holding means thereby to hold the work from movement so that the under thread is brought into position to be cut, and means actuated by such further movement of the work-holding means to operate the thread-cutting device.

12. In a sewing machine, the combination with work-holding means, of stitch-forming mechanism comprising upper thread-handling mechanism and under thread-handling mechanism, a rotary turret on which the under thread-handling mechanism is sustained and which is provided with a throat-plate through which the under thread and a stay-cord are delivered, said throat-plate having a stay-cord-receiving notch, means to cut the stay-cord at the end of each stitching operation, and means coöperating with the throat-plate to hold the end of the stay cord in the notch until the next stitching operation is commenced.

13. In a sewing machine, the combination with work-holding means, of stitch-forming mechanism comprising upper thread-handling mechanism and under thread-handling mechanism, a rotary turret on which the under thread-handling mechanism is sustained and which is provided with a throat-plate through which the under thread and a stay-cord are delivered, said throat-plate having a stay-cord-receiving notch, means to cut the stay-cord at the end of each stitching operation, a plate carried by the work-holding means and situated to engage the throat-plate at the end of the stitching operation and hold the end of the stay-cord in said notch.

14. In a sewing machine, the combination with work holding means, of stitch-forming mechanism comprising upper thread-handling mechanism and under thread-handling mechanism, a rotary turret on which the under thread-handling mechanism is sustained and which is provided with a throat-plate and means to deliver a stay-cord therethrough, said throat-plate having a stay-cord-receiving notch, means to actuate the stitch-forming mechanism to perform a predetermined stitching operation and then come to rest, said means producing a relative movement between the work-holding means and stitch-forming mechanism and a rotary movement of the turret between successive stitching operation means to cut the under thread and stay-cord at the end of each stitching operation, and means to retain the end of the stay-cord in the stay-cord-receiving notch as the turret turns between the stitching operations.

15. In a sewing machine, the combination with work-holding means, of stitch-forming mechanism comprising upper thread-handling mechanism and under thread-handling mechanism, a rotary turret on which the under thread-handling mechanism is sustained and which is provided with a throat-plate and means to deliver a stay-cord therethrough, said throat-plate having a stay-cord-receiving notch, means to actuate the stitch-forming mechanism to perform a predetermined stitching operation and then come to rest, said means producing a relative movement between the work-holding means and stitch-forming mechanism and a rotary movement of the turret between successive stitching operations, means to cut the under thread and stay-cord at the end of each stitching operation, and a plate carried by the work-holding means and situated to engage the throat-plate at the end of the stitching operation thereby to hold the end of the stay-cord in the stay-cord-receiving notch.

16. In a sewing machine, the combination with stitch-forming mechanism, of work-holding means comprising means to hold the work clamped during the stitching operation, a thread-cutting device carried by the work-holding means and comprising a pair of pivotally-mounted cutting elements, and a toggle device for actuating said elements.

17. In a sewing machine, the combination with stitch-forming mechanism, of work-holding means comprising means to hold the work clamped during the stitching operation, a thread-cutting device carried by the work-holding means and comprising a pair of pivotally-mounted cutting elements, a spring to hold said elements yieldingly in inoperative position, and a toggle device to give said elements a thread-cutting movement.

18. In a sewing machine, the combination with stitch-forming mechanism, of work-holding means, means to actuate the stitch-forming mechanism and work-holding means to produce a relative movement between them and to cause the stitch-forming mechanism to perform a predetermined stitching operation and then to come to rest, a thread-cutting device comprising a pair of pivotally-mounted cutting elements, a spring normally holding said cutting elements in inoperative position, a toggle device to move said elements into thread-cutting position, and means actuated by the relative movement between the work-holding means and stitch-forming mechanism to operate the toggle device.

19. In a sewing machine, the combination with stitch-forming mechanism, of work-holding means, a pair of pivotally-mounted cutting elements, one of which presents a cutting block and the other a cutting knife, a toggle device for moving the cutting knife toward the cutting block, and means for adjusting the pivots of said cutting elements so that the knife may meet the block when the toggle levers are straightened.

20. In a sewing machine, the combination with stitch-forming mechanism, of work-holding means, a thread-cutting device carried by the work-holding means and comprising a pair of pivotally-mounted cutting elements, one of which has a cutting block and the other a cutting knife, a toggle device for moving said block and knife toward each other to effect the cutting operation, and means for adjusting the pivots of said elements so that the knife will meet the block when the toggle lever is straightened.

21. In a sewing machine, the combination with upper thread-handling mechanism, of a rotatable turret including a throat plate, lower thread-handling mechanism on the turret, a thread-holding hook pivoted to the turret non-axially thereof, and means controlled by the rotation of the turret to cause said hook to seize the under thread and clamp it against the lower face of the throat plate.

22. In a sewing machine, the combination with upper thread-handling mechanism, of a rotatable turret including a throat plate, lower thread-handling mechanism on the turret, and means mounted independently of the throat-plate and operated by the rotation of the turret to clamp the under thread against the under face of the throat plate.

23. In a sewing machine, the combination with upper thread-handling mechanism, of a rotatable turret including a throat-plate, lower thread-handling mechanism on the turret, a thread-holding hook pivoted to the turret non-axially thereof, means controlled by the rotation of the turret to cause said hook to seize the under thread and clamp it against the lower face of the throat plate, and means to cut the under thread close to the work.

In testimony whereof I have signed my name to this specification.

FRANK ZALESKI.